3,433,604
CALCIUM CHLORIDE AND BORIC ACID EXTRACTION FROM MAGNESIUM CHLORIDE BRINES USING DIOLS AND CATECHOLS

Robert R. Grinstead, Walnut Creek, Calif., assignor to The Dow Chemical Company, Midland, Mich., a corporation of Delaware
No Drawing. Filed Sept. 22, 1965, Ser. No. 489,414
U.S. Cl. 23—312      12 Claims
Int. Cl. B01j *9/20;* C01f *5/32, 11/22*

---

ABSTRACT OF THE DISCLOSURE

This invention relates to a process for separating calcium and boron values from relatively concentrated $MgCl_2$ brines. According to this process, magnesium chloride brines containing at least 30 weight percent $MgCl_2$ in addition to relatively small proportions of calcium and boron salts are extracted with an aliphatic vicinal diol having 8 to 20 carbon atoms or a 4-substituted catechol wherein the substituent is an alkyl or alkoxy group containing from 3 to 12 carbon atoms or a halogen. During the extraction, the pH is controlled such that the effluent calcium and boron depleted brine has a pH of between 2 and 6. The organic and aqueous phases are then separated and the calcium and boron values are separated from the organic phase.

---

This invention relates to a process for the removal of calcium and boron values from magnesium chloride brines and more particularly relates to a process whereby calcium and boron values may be selectively removed and recovered from such brines by solvent extraction.

In the preparation of magnesium chloride for use in electrolytic cells for the production of magnesium, it is often desirable to remove all, or a major portion, of the calcium and boron values therefrom without simultaneously removing other metal values. It is likewise desirable to recover these values in usable form once they have been removed from the brine. Until the present time, no commercially acceptable process has been available whereby magnesium chloride brines could be purified by selectively removing calcium and boron values therefrom in such a manner that such values may be recovered as products.

It is an object of this invention to provide a process whereby calcium and boron values can be removed from magnesium chloride brines. It is a further object to provide a process whereby calcium and boron values may be recovered from magnesium chloride brines in relatively pure form. A further object is to provide a continuous solvent extraction process whereby calcium and boron values may be selectively removed from magnesium chloride brines into a water-immiscible organic extractant phase and recovered in relatively pure form from such organic extractant phase. These and other objects and advantages of the present invention will become obvious from a reading of the following detailed specification.

It has now been found that calcium and boron values may be recovered from magnesium chloride brines by contacting said brines with any one or more of certain water-immiscible organic extraction agents, hereinafter specified, to extract said calcium and boron values into the organic phase, and treating the organic phase to recover the calcium and boron values therefrom. Such process may be easily conducted either as a batch or continuous process.

The method of the invention may be applied in treating any aqueous brine rich in magnesium chloride and containing relatively small proportions by weight of calcium and/or boron compounds, present as impurities in the brine. Examples of the magnesium chloride brines which are suitable for use in this process include those derived, e.g. by concentration, from sea water, from the Great Salt Lake and from dissolved salt deposits and subterranean brines. For efficient utilization in this process, such magnesium chloride brine should contain at least 30 percent by weight of magnesium chloride, with concentration of from 34 weight percent to saturation being usually preferred.

Only a relatively limited group of substantially water-immiscible organic extraction agents have been found which possess selectively toward the calcium and boron values in magnesium chloride. Those materials which possess this unique selectively are the substituted catechols wherein the substituent consists of a halogen or an alkyl or alkoxy group containing from 3 to 12 carbon atoms, and aliphatic vicinal diols, preferably the aliphatic 1,2 glycols having from 8 to 20 carbon atoms. The catechols containing a 4-tertiary alkyl group from $C_4$ to $C_8$ are preferred, however. Suitable water-immiscible organic extraction agents include 4-t-butyl catechol, 4-t-octyl catechol, 1,2-octanediol, 2,3-octanediol, 4-t-amyl catechol, 4-n-hexyl catechol, 4-ethyl-1,2-hexane diol and 3,4,5-trimethyl, 1,2-heptane diol, and 2,3-heptadecane diol.

The solvent ability for calcium and boron ions of the water-immiscible liquid organic extraction agents is generally enhanced by the presence of an aliphatic alcohol adjuvant containing from 4 to 20 carbon atoms. Aliphatic alcohols having from 8 to 16 carbon atoms show the most pronounced effect on solvation, however, and are generally preferred. Suitable alcohols include 1-octanol, 2-octanol, tridecanol, isodecanol and the like.

When an alcohol adjuvant, such as defined above, is employed to enhance the solvent capability of the water-insoluble organic extraction agent, the mole ratio of alcohol to organic extraction agent is generally from about 0.5 to 4 and preferably from 1 to 2.

While the organic extraction agent, or mixture of organic extraction agent and alcohol, may be employed directly to extract the calcium and boron values from magnesium chloride brines, it is preferred to use a carrier or solvent for such active materials which is water-immiscible and inert to the extraction system. Virtually any liquid having a miscibility of less than about 10 percent by weight in water, and inert to the extraction system may be used if it is a solvent for the active extraction materials, i.e. the organic extractant and the alcohol, if one is employed. Typical of such materials are aliphatic hydrocarbons, aromatic hydrocarbons, ethers, chlorocarbons and the like. Kerosene and toluene have both been found to be exceptionally good solvents for use in the process of this invention. Sufficient solvent is generally employed to produce 0.1 to 0.5 molar solution of organic extractant in the solvent.

A solution of organic extractant, prepared in the above-described manner, is contacted with the magnesium chloride brine in any suitable manner to provide intimate contact, e.g. countercurrent flow, stirring, shaking and the like. Contact times of greater than 0.5 minute are generally required for adequate extraction, with from about 1 to 5 minutes being preferred. A volume ratio of organic phase to aqueous phase of 1:100 to 10:1 or higher may be used but phase ratios of from 1:10 to 10:1 are generally preferred.

For efficient removal of both calcium and boron values from magnesium chloride brines, the extraction is conducted in a manner such that the final pH of the treated aqueous effluent is between about 2 and 6, preferably between about 3 and 5, at the time of removal from contact with the extractant solution. Both calcium and boron values are extracted when such effluent pH is as low as 0.8 but appreciably lower efficiencies result, particularly with regard to the boron values. When the brine to be extracted contains a low content of boron values or when the principal interest is in extraction of the calcium values from such brine, an effluent pH of 1 to 5 is preferred. Such extraction is possible, however, with an effluent pH of less than 1 or as high as about 6.

Temperature of the liquids during the extraction step is not critical but a range of from about 10° C. to about 80° C. is generally employed. It is most convenient to operate at or near room temperature. In instances where the boron concentration in the brine is low or where it is desired to extract principally calcium from the brine, lower temperature of from 10–40° C., preferably 20–30° C. combined with a high volume ratio of organic to aqueous phase (in the order of from 5:1 to 10:1) may be employed. In instances where the calcium concentration in the brine is low or where it is desired to extract a higher proportion of boron from the brine, somewhat higher temperatures, e.g. 50–80° C. may be employed.

After intimate contact between the organic extractant solution and the brine for effecting the extraction, the organic and aqueous phases are allowed to separate. Even with single stage contact, most of the calcium and boron originally present in the magnesium chloride brine are solvated by the organic phase and removed from the aqueous phase. In addition to the calcium and boron values, small amounts of magnesium chloride are also generally found in the organic phase. Alkali metal values such as salts of sodium or potassium are substantially unaffected by the extraction and remain in the aqueous phase.

The organic and aqueous phases are easily separated by allowing layers to form and drawing off one or both such layers. The aqueous layer, now substantially reduced in calcium and boron values, may generally be used in commerce without additional purification. In this purified form, the $MgCl_2$ brine will find particular utility as starting material for the preparation of $MgCl_2$ feed to electrolytic cells for the production of magnesium metal.

The organic phase after extraction of the brine contains a solution of calcium and boron values together with minor amounts of magnesium as $MgCl_2$. These values may be recovered from the organic extractant by treating such extractant with an aqueous solution of a mineral acid, such as $HNO_3$, $HCl$, $H_2SO_4$, $H_2SO_3$, $H_3PO_4$ and the like. Such treatment removes the metal values from the organic extractant and causes them to pass into the aqueous acid phase. The organic extractant may then be reused in the extraction system and the calcium and boron values, now relatively concentrated, may be separated, reacted or recovered from the aqueous acid solution.

As an alternate recovery method, where calcium is in stoichiometric excess over boron, the calcium may be removed preferentially from the organic extractant with water. Most of the calcium in stoichiometric excess of the boron and little or none of the boron passes into the water phase which may then be treated by known methods to recover the calcium therefrom. The organic extractant may then be stripped with aqueous acid to remove the boron values therefrom together with any calcium values remaining after the previous water stripping. The organic extractant, now free of metal values, may be recycled to the extraction step and the aqueous acid phase may be treated to recover the metal values therefrom.

The following examples are provided as a more detailed description of various embodiments of the invention but are not to be construed as limiting the scope of the invention.

EXAMPLE 1

A water-immiscible organic extractant solution was prepared by forming a 0.20 molar solution of tertiary butyl catechol in a solution of 4 percent by volume of 2-octanol in kerosene. To 50 ml. aliquots of this organic extractant solution was added 25 ml. of an impure aqueous solution of $MgCl_2$ containing 36 percent by weight of $MgCl_2$, 2.14 gm./l. of calcium (as $CaCl_2$) and various amounts of boron (as $H_3BO_3$). The mixture of organic extractant and aqueous magnesium chloride solution was agitated for 3 minutes at 60° C. and the pH was maintained at 4.6 with small amounts of 10 N NaOH during this period. At the end of the agitation, layers were allowed to form and the phases were separated. The organic phase was extracted first with an equal volume of water, then with an equal volume of 1 N $HNO_3$. The layers thus formed were separated and analyzed to give the following results:

| Initial B, gm./l. | $MgCl_2$ brine raffinate | | Extracts from organic phase | | | | | |
| --- | --- | --- | --- | --- | --- | --- | --- | --- |
| | | | $H_2O$ (gm./l.) | | | $HNO_3$ (gm./l.) | | |
| | B, gm./l. | Ca, gm./l. | B | Ca | Mg | B | Ca | Mg |
| 0.21 | 0.004 | 1.63 | 0.009 | 0.044 | 0.11 | 0.093 | 0.24 | 0.05 |
| 0.42 | 0.008 | 1.18 | 0.014 | 0.032 | 0.087 | 0.19 | 0.45 | 0.081 |
| 0.85 | 0.013 | 0.71 | 0.028 | 0.023 | 0.093 | 0.39 | 0.67 | 0.075 |

It will be noted that the presence of increasing amounts of boron values are beneficial to the removal of calcium from the magnesium chloride brine.

EXAMPLE 2

In the same manner as Example 1, 15 ml. of an impure $MgCl_2$ brine containing 36 percent by weight $MgCl_2$ was agitated for 3 minutes at room temperature with 90 ml. of a 0.2 M solution of tertiary butyl catechol in a mixture of 4 percent by volume of 2-octanol in kerosene. The pH was maintained at 3.6 during the agitation by the addition of 10 N NaOH. At the end of the agitation period, the phases were separated and the organic phase was stripped first with an equal volume of water then with an equal volume of 1 N $HNO_3$. Analysis of the various aqueous solutions gave the following

| | B, gm./l. | Ca, gm./l | Mg, gm./l |
| --- | --- | --- | --- |
| Original brine | 0.21 | 4.0 | 125 |
| Aqueous raffinate | 0.004 | 0.56 | 125 |
| Organic phase: | | | |
| Stripped by $H_2O$ | 0.003 | 0.56 | 0.06 |
| Stripped by $HNO_3$ | 0.031 | 0.052 | 0.06 |

EXAMPLE 3

In order to demonstrate the effectiveness of the process of this invention to extract calcium values from magnesium chloride brines in the absence of boron values, a 30 ml. sample of a magnesium chloride brine containing 36 percent by weight $MgCl_2$, <12 mg./l. B and 1.1 gm./l. Ca was agitated with 30 ml. of a solution of 0.10 M tertiary butyl catechol in a solution of 2 percent 2-octanol in kerosene for 2 minutes at room temperature. The pH was maintained at 3.6 during the extraction.

At the end of this period, the layers were separated and the organic layer was stripped first with an equal volume of water, then with an equal volume of 1 N $HNO_3$. Analysis of the various fractions showed the following:

|  | Ca gm./l. |
|---|---|
| Original $MgCl_2$ brine | 1.08 |
| Raffinate | 0.79 |
| Organic | 0.30 |
| Stripped by $H_2O$ | 0.30 |
| Stripped by $HNO_3$ | 0.005 |

In the same manner, a single stage extraction of a sample of the same $MgCl_2$ brine was conducted with 4-tertiary-octyl catechol with the following results:

|  | Ca gm./l. |
|---|---|
| Original brine | 1.08 |
| Raffinate | 0.93 |
| Organic | 0.16 |

EXAMPLE 4

In the same general manner as above, 25 ml. samples of a 34 weight percent $MgCl_2$ brine containing 0.66 gm. Ca/l. and <12 Mg B/l. were stirred for 10 minutes with 25 ml. of 0.50 molar 2,3-octanediol in an aromatic hydrocarbon solvent. The pH was maintained at 3.6 during the extraction.

At the end of the extraction step, the layers were allowed to separate. The organic layer was stripped with an equal volume of water. Analysis of the aqueous raffinate from the $MgCl_2$ brine extraction and the water layer from the stripped solvent were as follows:

|  | Ca, gm./l | Mg, gm./l |
|---|---|---|
| Raffinate | 0.34 | 125 |
| Organic strip water layer | 0.32 | 0.65 |

In a similar manner, a single stage extraction of a sample of the same $MgCl_2$ brine was conducted with 1,2-octanediol and similar results were obtained.

EXAMPLE 5

A continuous extraction was conducted by continuously feeding into a stirred vessel under ambient conditions of temperature and pressure a magnesium chloride brine containing 33.2 weight percent $MgCl_2$, 158 p.p.m. boron as boric acid, 1.39 weight percent $CaCl_2$ and 1.0 weight percent NaCl at a rate of about 1.7 gallons per minute. Simultaneously a solution 0.4 molar in tertiary butyl catechol in kerosene containing 7.5 weight percent 2-octanol was added at a rate of 5.7 gallons/minute. The pH in this first mixer was maintained at an apparent value of 6.0 by addition (if necessary) of small amounts of an aqueous slurry of approximately 1.6 N $Mg(OH)_2$. The mixture of organic extractant and magnesium chloride brine passed continuously from this first mixer to a first settler where the organic and aqueous phases separated into layers. The first mixer and settler constitute the first extraction stage.

The organic phase containing a high concentration of calcium chloride and boric acid in tertiary butyl catechol passed from the settler to a second mixer. To this mixer was added an aqueous solution of about 4 percent by weight HCl and a rate of about 0.12 gal./min. The mixed organic extractant and aqueous acid pass from this mixer to a second settler where the organic and aqueous phases separate into layers. The organic extractant phase is recycled to the first mixer and the aqueous layer is removed from the system. The aqueous layer thus removed contains 6.4 weight percent $MgCl_2$, 15.4 weight percent $CaCl_2$, 550 p.p.m. tertiary butyl catechol, 1540 p.p.m. boron and is about 0.36 N in HCl. The second mixer and settler constitute the stripping stage for the organic extractant.

The aqueous phase from the first settler contained 33.3 weight percent $MgCl_2$, 30 p.p.m. boron, 0.15 weight percent $CaCl_2$, 1.0 weight percent NaCl, 50 p.p.m. tertiary butyl catechol and had a pH of about 4.6. This purified magnesium chloride brine may be removed from the system as product at this point. If a more highly purified magnesium chloride brine is desired, however, it is passed through an additional extraction stage. The second extraction of the aqueous phase produces a product which contains 33.3 percent $MgCl_2$, 15 p.p.m. boron, 0.05 weight percent calcium chloride, 1 weight percent NaCl, 50 p.p.m. tertiary butyl catechol and has a pH of about 4.1.

EXAMPLE 6

In order to demonstrate the effect of pH on the extraction of boron and calcium values from magnesium chloride brines, two experiments were conducted wherein samples of brine of the same composition were extracted in the same manner but each at a different pH. Run A was conducted by extracting 50 ml. of a brine containing 36 wt. percent $MgCl_2$ and both boron and calcium as impurities with 25 ml. of an extractant solution 0.20 molar in tertiary butyl catechol in kerosene containing 4 wt. percent 2-octanol. The extraction was carried out by stirring for 3 minutes and the pH was maintained at 0.8 by the addition of 12 N HCl. At the end of the extraction period, the layers were separated and the treated aqueous layer (raffinate) having a pH of 0.8 was analyzed for calcium and boron. The organic layer was stripped first with an equal volume of water and finally with an equal volume of aqueous 1 N HCl. The water strip layer and the HCl strip layer were then analyzed for calcium and boron.

Run B was conducted in the same manner as Run A except that the pH was maintained at 2.1 during the extraction and produced a pH in the treated aqueous layer of 2.1.

The results of such extractions were as follows:

|  | Run A | | Run B | |
|---|---|---|---|---|
|  | Ca, gm./l. | B, gm./l. | Ca, gm./l. | B, gm./l. |
| Initial brine | 0.69 | 0.160 | 0.69 | 0.160 |
| Raffinate | 0.38 | 0.125 | 0.38 | 0.041 |
| Water strip | 0.53 | 0.008 | 0.26 | 0.012 |
| HCl strip | 0.074 | 0.044 | 0.39 | 0.221 |

Various modifications can be made in the present invention without departing from the spirit or scope thereof for it is understood that I limit myself only as defined in the appended claims.

I claim:
1. A process for the recovery of boric acid and calcium chloride values from magnesium chloride brines containing at least 30 percent by weight $McCl_2$ together with such values which comprises contacting said brine with a water-immiscible organic extraction agent selected from the group consisting of aliphatic vicinal diols having from 8 to 20 carbon atoms and substituted catechols wherein said substituent is a member selected from the group consisting of alkyl and alkoxy groups containing from 3 to 12 carbon atoms and halogens to produce a boric acid and calcium chloride containing organic phase and boric acid and calcium chloride depleted aqueous phase, controlling the pH during said extraction such that the pH of the boric acid and calcium chloride depleted brine is from 2–6, separating the aqueous and organic phases and recovering the boric acid and calcium chloride values from the organic phase.

2. The process of claim 1 wherein the water-immiscible organic extraction agent is 4-tertiary-butyl catechol.

3. The process of claim 1 wherein the water-immiscible organic extraction agent is 4-tertiary-octyl catechol.

4. The process of claim 1 wherein the water-immiscible organic extraction agent is 1,2-octanediol.

5. The process of claim 1 wherein the water-immiscible organic extraction agent is 2,3-octanediol.

6. A process for the recovery of boric acid and calcium chloride values from magnesium chloride brines containing such values and containing at least 30 percent by weight $MgCl_2$ which comprises extracting said brine with a substantially water-immiscible organic extraction agent selected from the group consisting of aliphatic vicinal diols containing from 8 to 20 carbon atoms and 4-substituted catechols wherein said substituent is a member selected from the group consisting of alkyl and alkoxy groups containing from 3 to 12 carbon atoms and halogens in combination with an aliphatic alcohol adjuvant containing from 4 to 20 carbon atoms in a mole ratio of from 2:1 to 1:4 of organic extraction agent to alcohol, maintaining the pH during extraction such that the aqueous phase from such extraction has a pH of between 2 and 6, separating the organic and aqueous phases and removing calcium chloride and boric acid from the organic phase.

7. The process of claims 6 wherein the organic extraction agent is a 4-tertiary alkyl catechol wherein the alkyl group contains from 4 to 8 carbon atoms.

8. The process of claim 6 wherein the alcohol adjuvant is an aliphatic alcohol containing from 8 to 16 carbon atoms.

9. The process of claim 6 wherein the organic extraction agent is 4-tertiary-butyl catechol and the alcohol adjuvant is 1-octanol.

10. The process of claim 5 wherein the organic extraction agent is 4-tertiary-butyl catechol and the alcohol adjuvant is 2-octanol.

11. The process of claim 9 wherein the mole ratio of the organic extraction agent to the alcohol adjuvant is from 2:1 to 1:4.

12. A method of treating a brine containing at least 30 percent by weight $McCl_2$ and containing both calcium chloride and boric acid impurities therein, wherein the boric acid impurities are in stoichiometric excess of the calcum chloride impurities which process comprises contacting said brine with a water-immiscible organic extraction agent selected from the group consisting of alkyl and alkoxy groups containing from 3 to 12 carbon atoms and halogens to produce a boric acid and calcium chloride containing organic phase and a boric acid and calcium chloride depleted aqueous phase, controlling the pH during said extraction such that the pH of the boric acid and calcium chloride depleted brine is from 2–6, separating the aqueous and organic phases, and washing the organic phase with water to remove the calcium chloride values therefrom and recovering the boric acid values from the calcium chloride-depleted organic phase.

References Cited

UNITED STATES PATENTS

| | | | |
|---|---|---|---|
| 2,402,959 | 7/1946 | Gustafson | 23—91 |
| 2,968,523 | 1/1961 | Cunningham | 23—312 X |
| 2,969,275 | 1/1961 | Garrett | 23—312 X |
| 3,111,383 | 11/1963 | Garrett | 23—149 |
| 3,214,454 | 10/1965 | Blaser | 23—312 X |

FOREIGN PATENTS 910,541  11/1962  Great Britain.

NORMAN YUDKOFF, *Primary Examiner.*

S. J. EMERY, *Assistant Examiner.*

U.S. Cl. X.R.

23—90, 91, 149; 260—637